R. J. STONE.
SHIELD FOR TIRES.
APPLICATION FILED OCT. 27, 1909.
964,131.
Patented July 12, 1910.
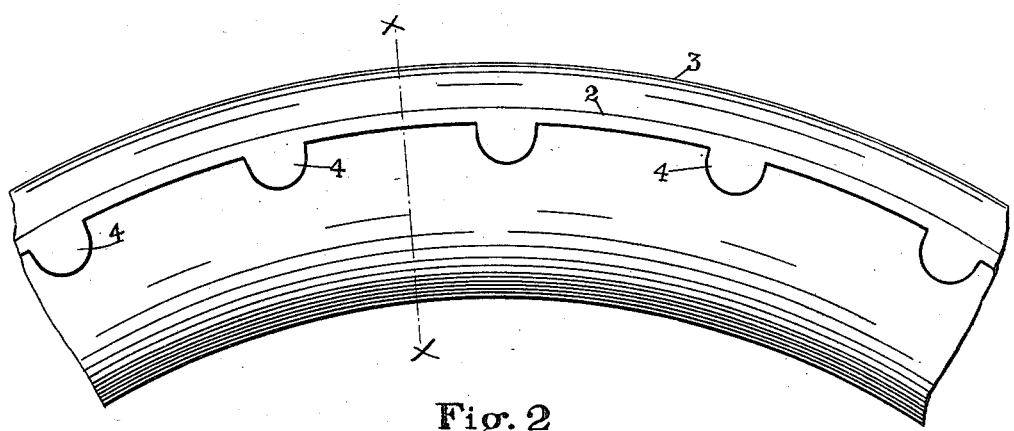
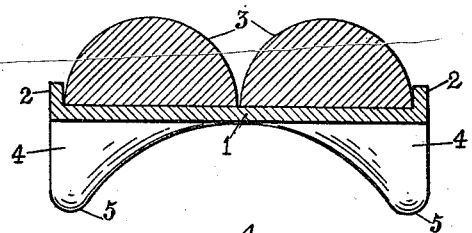
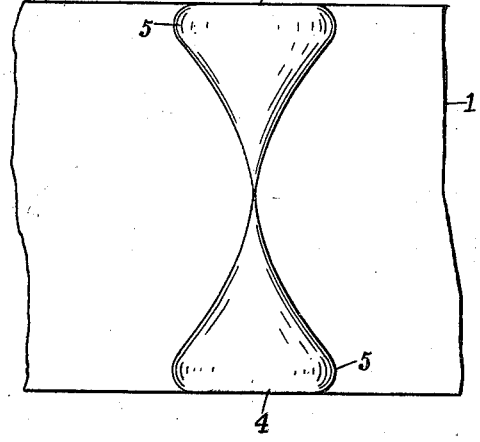
Witnesses
A. M. Shannon.
B. E. McGrann
Inventor
RALPH J. STONE
By
Attorneys

UNITED STATES PATENT OFFICE.

RALPH J. STONE, OF DETROIT, MICHIGAN.

SHIELD FOR TIRES.

964,131. Specification of Letters Patent. Patented July 12, 1910.

Application filed October 27, 1909. Serial No. 524,784.

*To all whom it may concern:*

Be it known that I, RALPH J. STONE, a citizen of the United States of America, residing at Detroit, in the county of Wayne and State of Michigan, have invented certain new and useful Improvements in Shields for Tires, of which the following is a specification, reference being had therein to the accompanying drawings.

This invention relates to a shield for pneumatic tires and more particularly to an arrangement thereof which is full protection against cuts or punctures, and which may be applied readily to a tire without the use of buckles or like fastening means.

The invention consists in the matters set forth, and more particularly pointed out in the appended claims.

Referring to the drawings, Figure 1 is a view in side elevation of a portion of a pneumatic tire equipped with a device embodying features of the invention; Fig. 2 is a view in cross section through a shield on or about line $x$—$x$ of Fig. 1; and Fig. 3 is a plan view of a portion of the inner face of the shield.

In the drawings, an annular rim 1 of sheet metal has outer marginal flanges 2 adapted to retain a cushion tread 3 of any preferred design, and as herein shown preferably with a face that prevents side slipping or skidding. The annulus 1 is so proportioned as to encircle closely a tire for which it is fitted when the tire is fully inflated, and is prevented from creeping and is retained in position by a plurality of pairs of oppositely disposed lugs 4 on its inner face arranged at regular intervals around the rim. Each lug is approximately triangular in cross section while its peripheral elements are longitudinally concave, the radius of curvature corresponding closely to that of the cross sectional radius of the tire for which the rim is adapted. At their outer ends the lugs have rounded margins 5, and at their inner ends the surfaces of the lugs form unbroken or smoothly rounded connection with the inner face of the rim. The lugs may be made integral with the rim or may be secured thereto and may be formed on the rim in any preferred manner. By this construction a tire shield is obtained which may be readily applied to a tire and when placed thereon retains its position and does not creep or roll. The lugs grip the tire sufficiently to prevent any movement of the rim thereon while at the same time they present smoothly rounded faces which do not injure the tread of the tire.

Obviously, changes in the details of construction may be made and I do not limit myself to any particular form or arrangement of parts.

What I claim as my invention is—

1. A shield for pneumatic tires comprising an annular rim provided on its inner face with pairs of oppositely disposed transverse lugs having conoidal faces corresponding in curvature longitudinally to the cross sectional curvature of the tire.

2. A shield for pneumatic tires comprising an annular rim provided on its inner face with pairs of oppositely disposed transverse lugs having conoidal faces corresponding in curvature longitudinally to the cross sectional curvature of the tire and rounded base margins.

3. A shield for pneumatic tires comprising an annular rim provided on its inner face with pairs of oppositely disposed transverse lugs having conoidal faces corresponding in curvature longitudinally to the cross sectional curvature of the tire, rounded base margins, marginal flanges on the rim, and a cushion tread between the flanges.

In testimony whereof I affix my signature in presence of two witnesses.

RALPH J. STONE.

Witnesses:
OTTO F. BARTHEL,
C. R. STICKNEY.